THIN POLYMERIC FLIM MEMORY DEVICE

Filed Nov. 20, 1964

INVENTOR.
LAWRENCE V. GREGOR
BY
S. P. Tedesco
ATTORNEY

United States Patent Office 3,519,999
Patented July 7, 1970

3,519,999

THIN POLYMERIC FILM MEMORY DEVICE

Lawrence V. Gregor, Crompond, N.Y., assignor to International Business Machines Corporation, New York, N.Y., a corporation of New York Filed Nov. 20, 1964, Ser. No. 412,726
Int. Cl. G11c *11/24;* H01g *1/00*
U.S. Cl. 340—173 15 Claims

ABSTRACT OF THE DISCLOSURE

This invention relates to thin film polymeric memory devices and, more particularly, to memory arrays formed in laminate fashion wherein each memory device is formed of a thin polymeric film interpositioned between two metallic electrodes. The memory, or binary, conditions of the memory device are indicated by the polarized state of the polymeric film resulting from application of electrical fields in excess of a critical intensity. When polarized, the polymeric film exibits a nondestructive breakdown-like increased conduction in response to electrical fields within a critical intensity range and of opposite polarity with respect to previously applied polarizing electrical fields.

The present trend in the electronics industry is to reduce the size and cost of electrical components and, also, to minimize space requirements of operative arrangements of the same. For example, numerous solid-state devices and also, techniques for batch-fabricating such devices along with functional interconnections into operative circuit arrangements are being developed. By such developments, industry hopes to overcome certain problems resulting from the increased complexity of present day electronics systems and, also, the objectionable high cost of fabricating the same.

Until recently, a comparatively small portion of industry's effort has been directed to the batch-fabrication of memory arrays; rather, the largest portion of such effort has been to reduce the size of the individual components, e.g., tunnel diodes, transistors, ferrite cores, coupling semiconductor diodes, etc. While the physical dimensions of memory arrays have been reduced, such dimensions have not reached their lowest limit; moreover, assemblage of such components requires human intervention and manufacturing costs have not been substantially reduced. To this end, techniques for batch-fabricating memory arrays have been described in the literature whereby substantial savings in cost and, also, fabrication time are realized. For example, in the fields of magnetics and cryogenics, memory arrays have been described comprising a thin film, or sheet, of material having peculiar characteristics, i.e., square loop or superconductive, respectively, positioned between a coordinate array of word and bit drive lines. In such structures, memory devices are defined at portions of the thin sheet located between word and bit driving lines at a crossover point. The fabrication process is very much simplified in that the patterns of word and bit drive lines, respectively, and the thin film for defining the plurality of memory devices can be individually fabricated and then laminated to form the memory array. Such techniques have significantly simplified the fabrication process.

Also, investigations into the electrical properties of very thin dielectrical films used in such laminate structures have been made and reported in the technical literature. It has been reported that electrical conduction through thin dielectric films, e.g., polymeric, sandwiched between two metal electrodes can be supported by one of several mechanisms. For example, conduction in very thin polymeric films, e.g., less than 100 A., can be supported by a quantum-mechanical tunneling process as described, for example, in "Electronic Conduction of Polymer Single Crystals," by A. Von Roggen, Physical Review Letters, Nov. 1, 1962. Tunneling currents through the polymeric film reduces exponentially as a function of increasing thickness; for thicknesses in excess of 100 A., conduction can be supported by high-field (Schottky) emission of energetic electrons from a metal electrode into the conduction band of the polymeric film as described, for example, in "Schottky Emission Through Thin Insulating Films," by P. R. Emtage and W. Tantraporn, Physical Review Letters, Apr. 1, 1962. Also, an "organic seminconductor" behavior has been observed in thin polymeric films as, for example, reported by D. D. Eley et al., The Electrical Conductivity of Solid Free Radicals and the Electron Tunneling Mechanism," Symposium on Electrical Conductivity in Organic Solids, pages 257 through 276 and, also described in the co-pending patent application Ser. No. 340,067, entitled "Electrical Circuit Components," filed in the name of Peter White on Jan. 24, 1964, now U.S. Pat. No. 3,303,357 and assigned to a common assignee. Generally, the conduction characteristics supported by these mechanisms are reversible and show inversion symmetry, i.e., the direction and magnitude of conduction is dependent upon the polarity and intensity, respectively, of the applied electrical fields.

It has been discovered that certain polymeric films having an aromatic hydrocarbon molecular structure and formed in thicknesses between 100 A. and 300 A. structure exhibit certain conduction characteristics which are not directly supported by any of the charge transfer mechanisms hereinabove mentioned. Such films are polarizable by electrical fields in excess of a critical intensity and, when polarized, exhibit different conduction characteristics in response to electrical fields of opposite polarities. When in a polarized state, the polymeric film exhibits an apparent breakdown and abrupt current increase in response to electrical fields of polarity opposite to the polarizing electrical fields and applied within a critical intensity range; conduction through the polymeric film is substantially supported by Schottky emission in response to electrical fields of a same polarity as the polarizing electrical fields. The peculiar conduction characteristics of the polymeric film are similar, in effect, to a breakdown of dielectric properties but do not rupture the capacitor-like properties of the film. When electrical fields applied to a polarized polymeric film exceed the critical intensity range, such effect disappears whereby further conduction through the polymeric film is supported by Schottky emission and polarization of the film is reversed. Hence, the conduction characteristics of the polymeric film are bistable in nature and suitable for memory applications.

Accordingly, an object of this invention is to provide a memory device comprising a thin polymeric film.

Another object of this invention is to provide a memory device comprising a thin polymeric film which is polarizable by applied electrical fields of given polarity to store binary information.

Another object of this invention is to provide a two-terminal thin film polymeric memory device wherein the stored information is identified by the conduction characteristic of a thin polymeric film.

Another object of this invention is to provide a novel memory array fabricated in integrated fashion and comprising two-terminal memory devices comprising thin polymeric films.

These and numerous other objects and features of this invention are achieved by positioning a thin polymeric film of a thickness between 100 A. and 300 A. and formed of a conjugated hydrocarbon residue having an aromatic structure between two metallic electrodes. Further, the polymeric film should be physically continuous to eliminate the possibility of short-circuits between the metallic electrodes. A phenomenological model is proposed wherein such effect results from the "spilling" of polarized trapping centers whereby space charge effects are reduced and an intermediate conduction channel is defined in the polymeric film. Although the subsequent discussion of the phenomenological model for the conductivity behavior observed in these films is limited to "electrons," it will be obvious to those skilled in the art that the model applies equally well to conductivity by "holes" (or missing electrons from the valence band) with appropriate changes in sign when polarity is important. The trapping centers are polarized by electrical fields in excess of a critical intensity and spilled by electrical fields of opposite polarity and within a critical intensity range. On the other hand, satisfied trapping centers in the polymeric film inhibit the intermediate conduction channel and electrical fields of a same polarity as the polarizing electrical fields support conduction only by Schottky emission.

The polymeric film is formed to retain much of its aromatic structure to insure a high level of available $\pi$ electrons. Also, during the polymerization process, a portion of the conjugated bonds are altered to purposefully introduce trapping centers in the polymeric film which are polarized by interaction with the $\pi$-orbitals in the organic complex as oriented by applied electrical fields. It is known that some electrons in a polymeric structure are free to travel through the organic complex along overlapping $\pi$-orbitals. Due to the polyarization of $\pi$-orbitals when subjected to electrical fields, the "entry" and "exit" potentials of the trapping centers as seen by a conduction electron are varied. In other words, the energy required to free, or "spill," a trapped electron from a trapping center is varied when electrical fields are applied in a particular direction. For a critical intensity range of electrical fields, the energy $ev$ imparted to a conduction electron is such that trapping centers are ineffective anr space charge, which arises from trapped electrons, in the polymeric film is sufficiently lowered to define an intermediate conduction channel at an energy level lower than the bottom of the normal conduction channel in the polymeric film (binary "1" state). In accordance with the proposed model, electrical fields in excess of this critical range appear to orient the $\pi$-orbitals such that the associated fields increase the "exit" potential of the trapping centers whereby electrons remain trapped. As a result, increased space charge inhibits, or "closes off," the intermediate conduction channel and subsequent conduction through the polymeric film is supported only by Schottky emission (binary "0" state).

The polymeric films of this invention exhibit a finite relaxation time, e.g., in the order of 30 minutes, and are maintained in a particular memory state by periodic polarizations. In addition, due to the narrowness of the critical intensity range of electrical fields required to enable the intermediate conduction channel in a polarized polymeric film, memory devices in accordance with this invention are better adapted for destructive readout operation.

The foregoing and other objects, features and advantages of the invention will be apparent from the following more particular description of preferred embodiments of the invention, as illustrated in the accompanying drawings.

Figure 1:
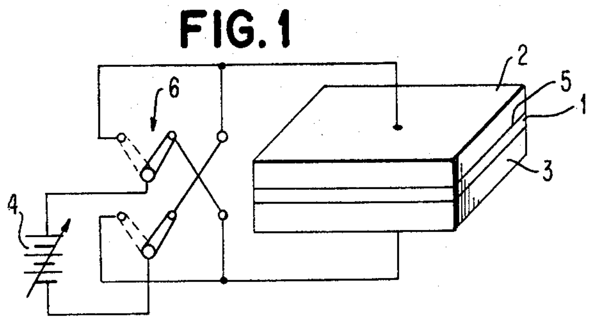
FIG. 1 shows a memory device in accordance with this invention comprising a thin polymeric film positioned between a pair of metallic electrodes.

Referring to FIG. 1, a memory device in accordance with this invention comprises a thin pinhole-free polymeric film 1 sandwiched between first and second metallic electrodes 2 and 3. The structure of FIG. 1 defines, for example, a single bit position in the integrated memory array shown in FIG. 4 and hereinatfer described. Metallic electrodes 2 and 3 are formed by conventional techniques and should be nonreactive with polymeric film 1; the metallic electrodes can be formed of materials selected from the group of lead, aluminum, copper, tin, silver, etc. Metallic electrodes 2 and 3 are connected across a variable voltage source 4 via a double-pole, double-throw switch 6 whereby electrical fields of controlled intensity and polarity are applied transverse to the plane of polymeric film 1.

Polymeric film 1 is formed in a thickness ranging between 100 A. and 300 A. and has a molecular structure containing a high ratio of $\pi$ electrons to monomer units. Accordingly, the lower limit of film thickness is at least sufficient to preclude significant quantum-mechanical tunneling of conduction electrons between metallic electrodes 2 and 3; the upper limit of film thickness is such that electrical fields E are effective to orient $\pi$-orbitals associated with the individual organic complexes across the full thickness of polymeric film 1. The intensity of electrical fields E should be ineffective to create corona discharge or rupture polymeric film 1.

Figure 3A:
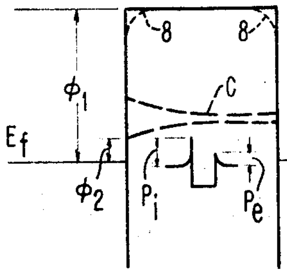
FIGS. 3A to 3E show energy-band diagrams for a metal-polymer-metal structure of FIG. 1 useful to understand the proposed phenomenological model.

The normal conduction channel through polymeric film 1 is at a substantially higher energy level than the Fermi level $E_f$ of metallic electrodes 2 and 3 (cf., FIG. 3A). When film thickness is less than the probability length of conduction electrons, electrical fields E of relatively low intensity can support quantum-mechanical tunneling through polymeric film 1. At this time, a number of conduction electrons in, for example, negatively-biased metallic electrode 2 have sufficient probability of penetrating the potential barrier, whose work function is $\phi_1$, of the metal-polymer interface 5 and pass through the classically forbidden region in polymeric film 1 to metal electrode 3. As the thickness of polymeric film 1 is increased, for example, in excess of 100 A., the potential barrier width of metal-polymer interface 5 seen by conduction electrons in metallic electrode 2 is increased sufficiently to preclude quantum-mechanical tunneling. Accordingly, when the thickness of polymeric film 1 exceeds, say 100 A., current transfer between metallic electrodes 2 and 3 is supported by Schottky emission.

With respect to polymeric films formed in accordance with this invention, current transfer is basically supported by Schottky emission; however, peculiar conduction characteristics result from a field-dependent "band" conduction due to the nature of the polymeric material. The field-dependent "band" conduction is sensitive to electrical fields E within a critical intensity range and to the presence of trapping centers within the polymeric material. In accordance with the model hereinafter set forth, these trapping centers are polarized in particular fashion when electrical fields E in excess of this critical intensity range are applied across polymeric film 1. When polarized, the trapping centers are responsive to a critical range of electrical fields E of opposite polarity and within the crtical intensity range to "spill" trapped electrons and lessen space charge within polymeric film 1. Moreover, the orientation of $\pi$-orbitals associated with the organic aromatic complexes are such that an intermediate conduction channel is defined at a lower energy level than the normal conduction channel of the polymeric film 1.

Accordingly, the polymerization process for forming polymeric film 1 should supply sufficient energy to alter chemical bonding within an organic complex to such an extent that trapping centers are induced and the probability of overlap between the $\pi$-orbitals is increased, such overlap providing a path for conduction electrons. A preferred process for forming thin polymeric film 1 is to employ a low energy glow discharge technique, for example, as described in copending application Ser. No. 334,721, entitled "Method and Apparatus for Producing an Organic Plasma and for Depositing Polymer Films," by R. A. Connell et al., filed on Dec. 31, 1963 and assigned to a common assignee. In the described process, monomeric vapors at a low pressure are excited by a combination of magnetic and electrical fields and a glow dicharge is struck. The plasma thus formed is brought into contact with a substrate onto which the excited monomer ions, free radicals, and molecules are condensed and polymerized; secondary magnetic fields normal to the substrate plane provide greater control of the nature and homogeneity of the polymeric film. In the described method, the excitation energy is precisely controlled so as to retain much of the aromatic structure of the organic complex and, in addition, to alter the conjugated bonds to introduce trapping centers in the polymeric film. The monomeric material may comprise any of the known polymerizable aromatic organic compounds characterized for example, by the structure

R—CH=CH—R' the unsaturated group —CH=CH—R' in conjugation with an aromatic hydrocarbon structure R insuring the presence of a significant number of traps upon polymerization. In such compounds, R' is any desired substituent atom or group. For instance, R' may be selected from the vinyl, alkyl, and aryl groups. Typical suitable compounds include: styrene o-, m-, and p-divinyl benzene; methyl styrene; ethyl styrene; cinnamoyl acetate; cinnamic acid; cinnamaldehyde; vinyl naphthalene; phenylstyrene; stilbene; etc.

Figure 2:
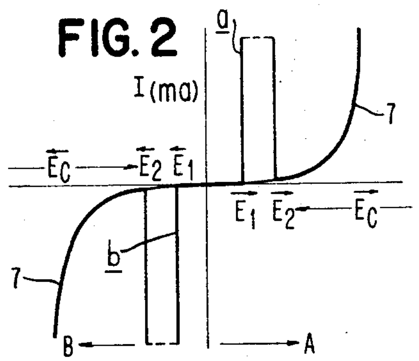
FIG. 2 illustrates the electrical field E–current I characteristics of a thin film memory device of FIG. 1.

Typical conduction characteristics of such materials in the structure of FIG. 1 are illustrated in FIG. 2. When polymeric film 1 is first deposited, trapping centers are unpolarized and the $\pi$-orbitals are unoriented. At this time, conduction through polymeric film 1 in response to electrical fields E in either the A or B direction follows a Schottky emission curve 7. As the intensity of electrical fields $\overleftarrow{E}$ (arrow indicating B direction) applied across polymeric film 1 is increased sufficiently to orient $\pi$-orbitals in the organic complex, the trapping centers are polarized such that the "exit" potential seen by a trapped electron is higher in the B direction than in the A direction and the trapped electrons exert a space charge. The "exit" potential seen by an electron in a polarized trapping center is not overcome by electrical fields E of maximum allowable intensity across polymeric film 1. Accordingly, conduction through polymeric film 1 in response to subsequent applications of electrical fields $\overleftarrow{E}$ follows the negative swing of the Schottky emission curve 7, the trapping centers being polarized in the A direction. When electrical fields $\vec{E}$ (arrow indicating A direction) are subsequently applied, polymeric film 1 experiences, in effect, a nondestructive breakdown at a critical value of applied electrical fields $\vec{E}_1$ whereat electrons in trapping centers are "spilled," i.e., space charge is reduced, and conduction through polymeric film 1 increases very rapidly as indicated by the current spike *a*. If electrical fields across polymeric film 1 are maintained within a critical range $\vec{E}_1-\vec{E}_2$, this increased conduction through polymeric film 1 continues which indicates that trapping centers are ineffective to "trap" conduction electrons and no space charge builds up. Accordingly, a field-dependent conduction channel is defined in polymeric film 1 at a lower energy than the normal conduction channel. Conduction electrons passing through the metal-polymer-interface 5 enter into this intermediate conduction channel and conduction between metallic electrodes 2 and 3 is effected along overlapping $\pi$-orbitals now critically oriented by electrical fields $\vec{E}_1-\vec{E}_2$. It appears that conduction electrons have sufficient energy to avoid the trapping centers or, if trapped, the "exit" potential is sufficiently low to allow such electrons to break away from such traps. However, when the magnitude of applied electrical fields is in excess of $\vec{E}_2$, hereinafter referred to as $\vec{E}_c$, trapping centers become polarized in the B direction and the "exit" potential seen by conduction electrons in the A direction is increased whereby such electrons become trapped and the resulting build up of space charge inhibits the intermediate conduction channel in the A direction. Subsequent applications of electrical fields $\vec{E}$ while trapping centers are polarized in the B direction is effective to support conduction through the polymeric film 1 only by Schottky emission as indicated by the positive swing of curve 7. Trapping centers polarized in direction B are responsive to the critical range of electrical fields $\overleftarrow{E}_1-\overleftarrow{E}_2$ to "spill" whereby conduction through polymeric film 1 increases very rapidly as indicated by the current spike *b*. When electrical fields are applied in excess of $\overleftarrow{E}_2$, i.e., $\overleftarrow{E}_c$, trapping centers in polymeric film 1 become polarized in the A direction and subsequent application of electrical fields $\overleftarrow{E}$ supports conduction by Schottky emission as indicated by the negative swing of curve 7. As polymeric film 1 can be made to exhibit a nondestructive breakdown in either direction A or B as determined by the polarity of polarizing electrical fields $\overleftarrow{E}_c$ or $\vec{E}_c$, respectively, the metal-polymer-metal structure of FIG. 1 can define distinct memory states.

Idealized energy band diagrams are illustrated in FIGS. 3A through 3E to facilitate an understanding of the proposed model, each diagram including an idealized potential diagram to illustrate the effects of polarization on trapping centers. For a conduction electron to enter into a trapping center, it must have an energy $ev_i$ sufficient to overcome an "entry" potential barrier $p_i$; once trapped, an energy $ev_e$ is required for the electron to overcome the "exit" potential barrier $p_e$. In FIGS. 3A through 3E, total space charge in polymeric film 1 seen by a conduction electron is represented by the height of the "exit" potential barrier in the direction of applied electrical fields. As hereinafter described, orientation of $\pi$-orbitals in response to applied electrical fields vary the "entry" and "exit" potential barriers $p_i$ and $p_e$ and, thereby, polarize trapping centers with respect to electrical fields E of particular polarity; as hereinafter described, polarized trapping centers have a finite relaxation time, e.g., in the order of 30 minutes, due to the tendency of the $\pi$-orbitals to thermalize. It should be noted that the energy band diagrams illustrated are similar to those conventionally employed to describe Schottky emission but for the presence of the intermediate conduction channel C shown in dashed outline and tapered in the direction of polarization.

As shown in FIG. 3A, polymeric film 1 has been polarized in direction A by the previous application of polarizing electrical fields $\overleftarrow{E}_c$. Accordingly, substantially all trapping centers are filled and the "exit" potential barrier $p_e$ seen by a conduction electron is less in the A direction than in the B direction; the "exit" potential barrier seen in the B direction is sufficient to preclude "spilling" of trapping centers and only Schottky emission can be supported in the B direction.

As illustrated, the intermediate conduction band C indicates allowable energy levels of conduction electrons which pass through metal-polymer interface 5 and thence through polymeric film 1. Accordingly, for breakdown conduction to occur through polymeric film 1, (1) space charge effects must be reduced by spilling of the polarized trapping centers so as to enable formation of intermediate conduction channel C; (2) at least an energy must be imparted to conduction electrons in negatively-charged metallic electrode 2 to overcome the work function $\phi_2$ defined between such electrode and the intermediate conduction channel; and (3) $\pi$-orbitals in polymeric film 1 must be oriented to overlap and support electron conduction through polymeric film 1. Each of these effects is realized when electrical fields within a critical intensity range $E_1$—$E_2$ are applied across the polymeric film 1 in a direction opposite to the polarizing electrical fields $E_c$.

Figure 3B:
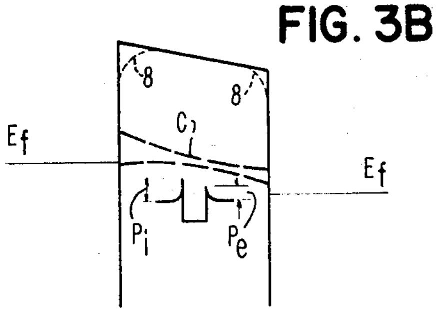
Figure 3C:
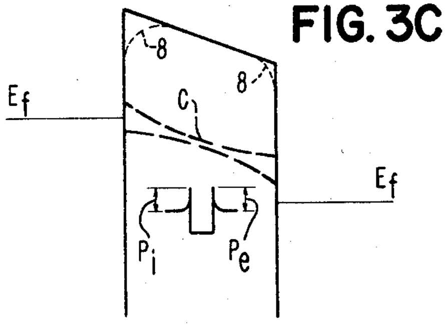

When electrical fields $\vec{E}$ are applied across polymeric film 1 polarized in the A direction, the Fermi level $E_f$ in negatively-biased metallic electrode 2 is raised and that in the positively-biased metallic electrode 3 is correspondingly reduced as shown in FIG. 3B. The actual potential barrier seen by a conduction electron in metallic electrode 2 is indicated by the dashed line 8 which differs from the normal conduction channel due to image forces of electrons in metallic electrodes 2. The energy band diagram of FIG. 3B illustrates the application of electrical fields just less than $\vec{E}_1$, the energy imparted to free conduction electrons in metallic electrode 2 being slightly less than that required to overcome the work function $\phi_2$ of intermediate conduction channel C. At this time, $\pi$-orbitals in polymeric film 1 are oriented to reduce the "exit" barrier potential $p_e$ seen by an electron trapped in a trapping center. As the intensity of electrical fields is increased beyond $\vec{E}_1$, the "exit" barrier potential $p_e$ of the trapping centers is reduced sufficiently to "spill" electrons which pass along overlapping $\pi$-orbitals defining intermediate conduction band C. While the intensity of electrical fields is between the critical range $\vec{E}_1$–$\vec{E}_2$, the "exit" barrier potential $p_e$ of the trapping centers is is sufficiently reduced whereby conduction electrons are untrapped and large current transfer is effected between metallic electrodes 2 and 3 as indicated by the sharp current spike *a* in FIG. 2. This conduction process continues while electrical fields are maintained within the critical range $\vec{E}_1$—$\vec{E}_2$ as indicated in FIG. 3C, such conduction being indicated by a substantial untapering of conduction channel C.

Figure 3D:
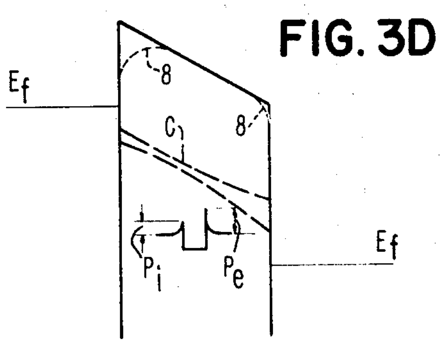
Figures 3E, 4:
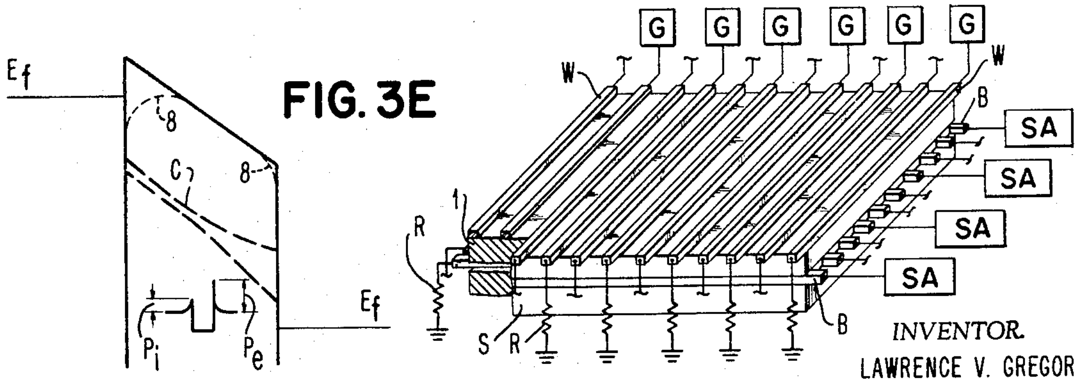
FIG. 4 illustrates a coordinate array of memory devices in accordance with this invention.

When the intensity of electrical fields is increased beyond $\vec{E}_2$, i.e., $\vec{E}_c$, polarization of trapping centers now occurs in the direction B due to reorientation of the $\pi$-orbitals; the result is that the "exit" potential barrier $p_e$ of the trapping centers now begins to increase. As shown in FIG. 3D, the intermediate conduction channel C begins to taper in direction B indicating an opposite polarization of polymeric film 1. Also, the "exit," potential barrier $p_e$ of the trapping centers increases to a level sufficient to prevent "spilling" whereby space charge builds up rapidly to inhibit the intermediate conduction channel C in the A direction. Accordingly, current transfer through polymeric film 1 in the A direction reduces at a very rapid rate. As shown in FIG. 3E, when the intensity of applied electrical fields $\vec{E}_c$ is increased, the energy of conduction electrons in metallic electrode 2 is sufficient to overcome the work function $\phi_1$ and conduction through polymeric film 1 is predominately supported by Schottky emission as illustrated by curve 7 of FIG. 2. When electrical fields $\vec{E}_c$ are terminated, the energy band diagram of the metal-polymer-metal structure of FIG. 1 is substantially as shown in FIG. 3A but for the reversed tapering of the intermediate conduction channel C (indicated in FIG. 3E) and, also, for the reduced "exit" potential barrier of the trapping centers in the B direction (also indicated in FIG. 3E). As polymeric film 1 is now polarized in the B direction, trapping centers can be "spilled" by electrical fields having an intensity range $\vec{E}_1$—$\vec{E}_2$ to effect large current transfer between metallic electrodes 3 and 2 as indicated by the sharp current spike *b* on FIG. 2. On the other hand, the "exit" potential barrier $p_e$ of the trapping centers in the A direction is sufficiently high to preclude "spilling" in response to electrical fields $\vec{E}$. Current breakdown occurs in the A direction only subsequent to the application of electrical fields $\overleftarrow{E}_c$ so as to reverse polarization of the trapping centers whereby conditions depicted by FIG. 3A are again established.

A two-dimensional array of memory devices in accordance with this invention is illustrated in FIG. 4 as comprising a sheet of polymeric film 1 and having a number of parallel word drive lines W and parallel bit drive lines B arranged in coordinate fashion on opposite planar surfaces so as to define a memory device of FIG. 1 at each crossover. The groups of word and bit drive lines can be fabricated by conventional techniques, e.g., vapor deposition, photolithographic processes, etc.; polymeric film 1 can be deposited in desired thickness, i.e., 100 A. to 300 A., by glow discharge techniques, as hereinabove described. For example, bit drive lines B, polymeric film 1, and word drive lines W can be formed by successive deposition processes onto a glass substrate S. Each word drive line W is connected to a pulse driver G of conventional design and terminated in a resistor R; also, each bit drive line B is connected to a sense amplifier SA which, in addition, includes pulse driver means and is likewise terminated in a resistor R.

The operation of the memory array can be in accordance with conventional half-selection techniques. For example, to write information in a particular word address, i.e., to polarize selected polymeric films 1 in the A direction to indicate binary "1" (cf., FIG. 2), the word address is initially "cleared" by energizing driver G connected to the corresponding word drive line W and sense amplifiers SA connected to each of the bit drive lines B to apply electrical fields $\vec{E}_c$ to portions of polymeric film 1 at each crossover and polarize each memory device in the B direction, i.e., binary "0." When the word address is "cleared," driver G connected to the corresponding word drive line W and sense amplifiers SA connected to bit drive lines B corresponding to selected memory devices wherein a binary "1" is to be stored are energized concurrently to apply electrical fields $\overleftarrow{E}_c$ across the corresponding portions of polymeric film 1. Accordingly, the selected memory devices are polarized in the A direction, i.e., binary "1"; memory devices corresponding to unenergized bit drive lines B remain polarized in the B direction, i.e., binary "0." It is evident that selection techniques other than half-selection techniques can be employed. For example, to effect a clear and write operation at a particular word address, the corresponding word drive line W can be energized so as to be singularly effective to apply electrical fields $\vec{E}_c$ to polarize corresponding memory devices in the B direction; subsequently, word drive line W can be energized to singularly apply electrical fields $\overleftarrow{E}_c$ across polymeric film 1, selected bit drive lines B being energized in opposition to reduce applied electrical fields to a level below $\overleftarrow{E}_2$ whereby the corresponding memory devices remain polarized in the B direction indicating the storage of a binary "0."

To read information from a selected word address corresponding word drive lines W are energized to apply electrical fields $\vec{E}_c$ across polymeric film 1. Accordingly, only memory devices in the selected word address and polarized in the A direction exhibit an abrupt current increase (cf., *a* in FIG. 2) whereby an information pulse is directed along the corresponding bit drive line B to the sense amplifiers SA. The sense amplifiers SA can be appropriately strobed during readout since it will be noted that noise pulses (c.f., *b* in FIG. 2) appear along the bit drive lines during the write operation.

The memory devices according to this invention have been observed to have a finite relaxation time. For example, a memory device formed of a lead-polydivinyl benzene-lead structure has a "memory" of 20 to 30 minutes at 23° C.; when the thickness of the polydivinyl benzene film is in the order of 250 A., the magnitude of voltage across the lead electrodes is approximately 3 volts to generate electrical fields $E_c$ and between aproximately 1.1 and 2 volts to generate electrical fields $E_1$ and $E_2$, respectively. Accordingly, information should be periodically written into the memory array of FIG. 4, for example, by programming drivers G and, also, sense amplifiers SA, e.g., by punched tape, magnetic tape, etc. The fact that the polymeric film tends to relax renders the memory array of FIG. 4 particularly useful where information storage is desired for a finite time. In addition, since the memory device behaves as a capacitor, the preferred repetition rate should not exceed 100 cycles/second.

While the invention has been particularly shown and described with reference to preferred embodiments thereof, it will be understood by those skilled in the art that various changes in form and details may be made therein without departing from the spirit and scope of the invention.

What is claimed is:

1. A memory array comprising a coordinate arrangement of word and bit drive lines and a continuous thin polymeric film therebetween whereby a memory cell is defined at each crossover point, said thin polymeric film having an aromatic hydrocarbon structure and formed in a thickness between 100 A. and 300 A., said thin polymeric film exhibiting field-dependent "band" conduction characteristics polarizable in a first direction by first polarity electrical fields in excess of a critical intensity and in a second direction by second polarity electrical fields in excess of a critical intensity, means including said word and bit drive lines for applying said first polarity electrical fields in excess of said critical intensity to polarize selected portions of said thin polymeric film in said first direction indicating the storage of a first binary quantity and said second polarity electrical fields in excess of said critical intensity to polarize other portions of said thin polymeric film in said second direction indicating the storage of a second binary quantity, polarized portions of said thin polymeric film exhibiting field-dependent "band" conduction in said first direction only in response to second polarity electrical fields when applied within a critical intensity range, and means for further energizing selected ones of said word and bit drive lines to apply second polarity electrical fields within said critical intensity range to selected portions of said thin polymeric film.

2. A memory array comprising a coordinate arrangement of word and bit drive lines and a continuous polymeric film prepared from monomeric material having an aromatic hydrocarbon residue whereby a memory cell is defined at each crossover, said polymeric film being formed in a thickness between 100 A. and 300 A. and exhibiting field-dependent "band" conduction polarizable in a first and second direction to indicate distinct memory states, said polymeric film being polarizable in said first direction by first polarity electrical fields in excess of a critical intensity and in said second direction by second polarity electrical fields in excess of a critical intensity, means including said word and bit drive lines for applying electrical fields of selected polarity to polarize selected memory cells in said first direction to indicate storage of a first binary quantity and in said second direction to indicate storage of a second binary quantity, field-dependent "band" conduction in said first direction being supported by second polarity electrical fields within a critical intensity range and less than said critical intensity, said applying means being further operative to apply second polarity electrical fields within said critical intensity range to said memory cells on a word basis, and means for sensing field-dependent "band" conduction in said first direction in said selected memory cells.

3. A memory array comprising a plurality of word and bit drive lines arranged in coordinate fashion and a thin polymeric film positioned therebetween to define a memory cell at each crossover, said polymeric film having an aromatic hydrocarbon molecular structure and formed in a thickness between 100 A. and 300 A., said polymeric film exhibiting field-dependent "band" conduction in response to applied first polarity electrical fields within a critical intensity range, said field-dependent "band" conduction being enabled by second polarity electrical fields greater than said critical intensity which is in excess of said critical intensity range, means for energizing a selected one of said word drive lines and selected ones of said bit drive lines to apply said second polarity electrical fields to selected memory cells on a word basis, said energizing means being further operative to energize a selected word drive line to apply said first polarity electrical fields to said memory cells on a word basis, and means connected to said bit drive lines for sensing field-dependent "band" conduction through said selected memory cells.

4. A memory array comprising a plurality of word and bit drive lines arranged in coordinate fashion and a thin polymeric film positioned therebetween to define a memory cell at each crossover, said thin polymeric film having an aromatic hydrocarbon molecular structure and formed in a thickness between 100 A. and 300 A., said polymeric film being polarizable to exhibit field-dependent "band" conduction in a first and a second direction indicative of the binary quantities, and means including said word and bit drive lines for applying first polarity electrical fields in excess of a critical intensity to polarize said memory cells on a word basis in said first direction and for applying second polarity electrical fields in excess of a critical intensity to polarize selected ones of said memory cells on a word basis in said second direction, said applying means being further operative to apply first polarity electrical fields within a critical intensity range less than said critical intensity to enable field-dependent "band" conduction in said second direction in said selected ones of said memory cells, and means connected to said bit drive lines for sensing field-dependent "band" conduction in said second direction in said selected ones of said memory cells.

5. The memory array defined in claim 4 wherein said applying means is operative to energize said word drive lines on an individual basis so as to apply said first polarity electrical fields in excess of said critical intensity to said memory cells on a word basis.

6. The memory array defined in claim 4 wherein said applying means is operative to concurrently energize said word drive lines on an individual basis and each of said bit drive lines so as to apply said first polarity electrical fields in excess of said critical intensity to said memory cells on a word basis.

7. The memory array defined in claim 4 wherein said applying means is operative to concurrently energize said word drive lines on an individual basis and selected ones of said bit drive lines so as to apply said second polarity electrical fields in excess of said critical intensity to said selected ones of said memory cells on a word basis.

8. The memory array defined in claim 4 wherein said applying means is operative to energize said word drive lines on an individual basis to apply said first polarity electrical fields within said critical intensity range to said memory cells on a word basis.

9. A memory device comprising:

a thin polymeric film positioned between a pair of metallic electrodes, said polymeric film having a thickness between 100 A. and 300 A. and characterized as having an aromatic hydrocarbon molecular structure, said film having conduction properties such that when it is polarized by a first applied electrical field of one polarity having greater than a critical intensity and is then subjected to a second applied electrical field of opposite polarity having an intensity within a critical range that does not exceed said critical intensity, said film exhibits field-dependent "band" conduction in response to said second field, such conduction being substantially discontinuous with respect to the conduction characteristic that normally would be exhibited by said film in response to electrical fields of only one polarity applied thereto or in response to electrical fields of any polarity having intensities which are outside of said critical range;

first voltage-applying means selectively operable for applying across said electrodes a first electrical field of a given polarity having an intensity greater than said critical intensity, thereby to place said film in a state indicative of a selected binary value, the absence of such a state indicating the opposite binary value;

and second voltage-applying means selectively operable for applying across said electrodes a second electrical field of a polarity opposite to said given polarity and having, at least for a limited time, an intensity within said critical range, whereby the presence or absence of a field-dependent "band" conduction in response to the application of said second field indicates the binary value stored in said memory device just prior to the application of said second field.

10. A memory device as set forth in claim 9 further comprising third voltage-applying means including said second voltage-applying means and initially operable for applying across said electrodes an electrical field of said opposite polarity having an intensity greater than said critical intensity, thereby to clear said memory device of any state which would be indicative of said selected binary value as a condition precedent to storing a new binary value in said device.

11. The memory device of claim 9 wherein said polymeric film is further characterized by having been polymerized from a monomeric material having the structure R—CH=CH—R′ where R is an aromatic hydrocarbon nucleus and R′ is a substituent atom or group.

12. The memory device of claim 11 wherein said polymeric film is further characterized as being formed of the polymerization product of an organic aromatic compound selected from the group of styrene and divinyl benzene.

13. The memory device of claim 12 wherein said film is further characterized as being formed of the polymerization product of an organic aromatic compound selected from the group consisting of styrene, o-, m-, and p-divinyl benzene, methyl styrene, ethyl styrene, cinnamoyl acetate, cinnamic acid, cinnamaldehyde, vinyl naphthalene, phenylstyrene, and stilbene.

14. A memory array comprising a coordinate arrangement of memory devices of the kind specified in claim 9, said array including word drive lines and bit drive lines arranged to provide first and second voltage-applying means as specified in claim 9 for each of said memory devices.

15. A memory array as set forth in claim 14 wherein said memory devices share a continuous polymeric film, each intersection of a word line with a bit line defining an individual memory device.

References Cited

UNITED STATES PATENTS 3,319,141 5/1967 Cariou ------------ 317—258

TERRELL W. FEARS, Primary Examiner

U.S. Cl. X.R.

317—258